United States Patent [19]
Bauer et al.

[11] Patent Number: 4,776,004
[45] Date of Patent: Oct. 4, 1988

[54] COMMUNICATION SERVICES METHOD AND APPARATUS

[75] Inventors: Thomas M. Bauer, Bellemead; Thomas A. Dunn, Edison; Ross M. Richardson, Sea Bright, all of N.J.; Chun P. Tam, Naperville, Ill.

[73] Assignee: American Telephone and Telegraph Company, AT&T Bell Laboratories, Murray Hill, N.J.

[21] Appl. No.: 25,601

[22] Filed: Mar. 13, 1987

[51] Int. Cl.⁴ .................. H04M 3/42; H04M 15/12
[52] U.S. Cl. .................................. 379/127; 379/223
[58] Field of Search ............. 379/127, 139, 134, 113, 379/114, 123, 223

[56] References Cited

U.S. PATENT DOCUMENTS 4,054,756  10/1977  Comella et al. .................. 379/223

OTHER PUBLICATIONS

"MCI Prism II", MCI Telecommunication Corporation, 1986.
"ITT Longer Distance Account Code Feature Guide", United States Transmission Systems, Incorporated, (publication date unavailable).
"Alpha 1", STARNET Corporation, (publication date unavailable).

Primary Examiner—Stafford D. Schreyer
Attorney, Agent, or Firm—Richard J. Godlewski

[57] ABSTRACT

Apparatus and method are disclosed for providing a non-presubscription subaccount billing service utilized by customers on a "per call" or "as needed" basis. A calling customer initiates the service by dialing "0" plus the directory number of the called line. The local office serving the calling line recognizes the call as an operator-designated call and forwards the call along with the identification number of the calling line and the directory number of the called line to an operator system. The operator system prompts the calling line to enter additional call information. The calling customer enters a service activation code such as "15" and a two-digit subaccount billing number assigned by the customer. Receiving the service activation code and the subaccount billing number, the operator system activates the service by setting a subaccount billing indicator in an automatic message accounting record and extends the call to the called line. Upon completion of the call, the operator system includes the connect time, elapsed time, calling line identification number, called line directory number, and subaccount billing number for the call into the AMA record. The record along with others is forwarded to a revenue accounting office where a billing system sorts the AMA records by subaccount billing numbers and prepares a billing statement with the details of each call listed for each subaccount billing number assigned by the customer.

29 Claims, 7 Drawing Sheets

FIG. 5
AMA RECORD

| 500 → | |
|---|---|
| CONNECT TIME | |
| ⋮ | |
| ELAPSED TIME | |
| CALLING LINE NUMBER | |
| CALLED LINE NUMBER | |
| 501 → SAB INDICATOR | SUBACCOUNT NUMBER |
| ⋮ | |

FIG. 6
RAO HANDLING OF
AMA RECORDS WITH SAB NUMBERS

FIG. 7
SAMPLE SUBACCOUNT BILLING STATEMENT

| CALLING STATION NUMBER | SUBACCOUNTS | NO. OF CALLS UNDER EACH SUBACCOUNT | CALL DURATION (MINUTES) | CHARGES PER CALL (DOLLARS) | TOTAL CHARGES PER SUBACCOUNT |
|---|---|---|---|---|---|
| 3124167321 | 01 | 1 | 0.36 | 1.09 | 1.09 |
| | 02 | 2 | 0.36<br>0.50 | 1.09<br>1.20 | 2.29 |
| | 03 | 1 | 0.20 | 0.80 | 0.80 |
| | 08 | 2 | 0.30<br>0.45 | 0.90<br>1.10 | 2.00 |
| | 11 | 1 | 0.36 | 1.09 | 1.09 |
| | 23 | 2 | 0.12<br>0.30 | 0.60<br>0.90 | 1.50 |
| | 41 | 3 | 1.10<br>2.00<br>0.25 | 3.00<br>7.00<br>0.80 | 10.80 |
| STATION SUBTOTAL | | | | | 19.57 |

COMMUNICATION SERVICES METHOD AND APPARATUS

TECHNICAL FIELD

This invention relates to telecommunications services and particularly to a method of and apparatus for deriving charge information for a call.

BACKGROUND OF THE INVENTION

Local exchange carriers and interconnect common carriers provide a subaccount billing service in which charges for telephone calls of a customer are sorted and listed under separate subaccount numbers assigned by the customer. This is a particularly useful service for professionals such as attorneys to bill clients for long distance phone calls made on their behalf. A problem with this subaccount billing service is that the customer must presubscribe to the service and pay a periodic charge for the service regardless of how many subaccount billing calls, if any, are made.

SUMMARY OF THE INVENTION

The foregoing problem and its associated disadvantages are solved and a technical advance is achieved in an illustrative operator system of a common carrier interconnect network in which a subaccount billing service is offered on a non-presubscription basis. As a result, a customer activates the service on a "per call" or "as needed" basis. Furthermore, a customer utilizing this subaccount billing service is able to "tag" each customer-selected outgoing call with, for example, a subaccount billing number assigned by the customer and to have their monthly telephone statement sorted and subtotaled by each subaccount billing number assigned during the billing period. Unlike other subaccount billing services and a departure in the art is that this service does not require the customer to presubscribe to the service. Rather, the customer uses the service on a "per call" or "as needed" basis and is billed only for actual usage of the service.

Illustratively, the service involves a customer dialing "0" plus the directory number of a called line to access a communications system such as an operator system and receiving a prompt signal from the system. The customer would then enter a service selection code and a customer assigned subaccount billing number such as "15XX" which would activate the subaccount billing service within the operator system and mark the call with the subaccount billing number. In response to a receipt of the service activation code and customer-assigned subaccount billing number, the method comprises extending the call through the communications system to, for example, a switching system to complete the call to the called directory number line. The method further comprises including the customer-assigned subaccount billing number in the charging information for the call. Furthermore, the charging information would include the number identification of the calling customer line, the directory number of the called number entered by the calling customer, and the connect and elapsed times of the call.

Advantageously, the communications services method would include charging the calling line a separate amount for each call in which a customer-activated subaccount billing number is received. The call itself would be billed at regular tariff dialed rates. In addition, the subaccount billing service may be advantageously applied to automated calling card calls, operator-handled collect calls, and third number billed calls.

The communication services apparatus comprises means responsive to a call for prompting a calling line for additional call information. A departure in the art is that the apparatus is characterized in that it further comprises means responsive to a receipt of a service activation code and a customer-assigned subaccount billing number for extending the call through a communications system and means for deriving charge information for the call including the customer-assigned subaccount billing number.

Furthermore, the means for deriving charge information includes means for recording connect and elapsed times for the call and the customer-assigned subaccount billing number.

Advantageously, the apparatus further comprises means for transmitting the charge information including the subaccount billing number to a billing system which in turn generates a billing statement including a charge for the call listed under the customer-assigned subaccount billing number entered for the call.

Another feature of the communication services apparatus is the means for deriving charge information is also responsive to an identification number indicative of the calling line and a directory number of the called line for including the calling line identification number and the called line directory number in the charge information.

DETAILED DESCRIPTION

Figure 1:
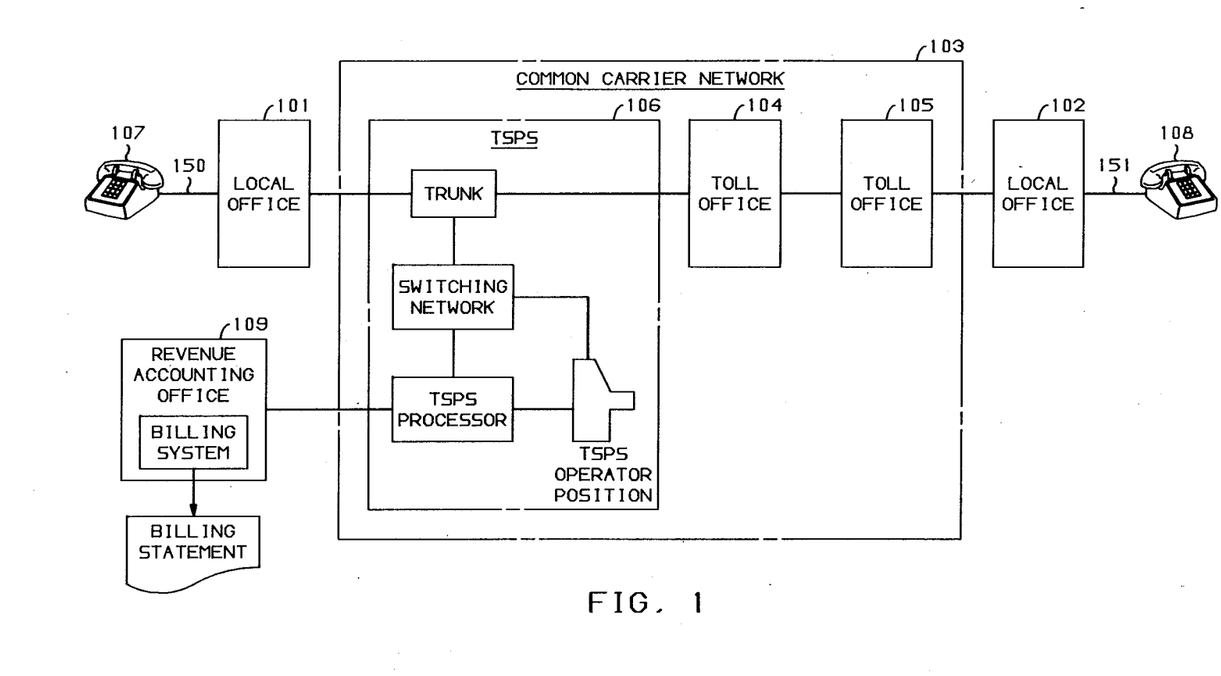
FIG. 1 depicts an illustrative telecommunications network including an operator system utilizing an illustrative method and apparatus for providing a non-presubscription subaccount billing service.

Depicted in FIG. 1 is a block diagram of an illustrative telecommunications network including a plurality of local exchange carrier telephone offices such as 101 and 102 interconnected as shown by a common carrier interconnect network 103. Interconnect carrier 103 includes a plurality of switching system offices such as 104 and 105. Common carrier interconnect network 103 also includes a plurality of operator systems such as traffic service position system center 106 intermediate between local office 101 and toll office 104. The operator system includes apparatus and utilizes an illustrative method for providing a non-presubscription subaccount billing service. This service is customer activated on a "per call" or "as needed" basis and permits a customer to "tag" each outgoing call with, for example, a 2-digit subaccount billing number assigned by the customer. The customer's monthly telephone statement is sorted and subtotaled by each subaccount billing numbers utilized by the customer during the billing period. Unlike other subaccount billing services, this subaccount billing service does not require a customer to presubscribe to the service. Rather, the customer utilizes the service on a "per call" or "as needed" basis and is billed only for actual usage.

Each of local exchange carrier telephone offices 101 and 102 serves a plurality of customer lines such as respective customer lines 150 and 151 which are connected to station sets 107 and 108, respectively.

By way of example, each of local telephone offices 101 and 102 may suitably be an electronic program-controlled switching system such as the 1A ESS TM switch available from AT&T. This switch is disclosed in U.S. Pat. No. 3,570,008, issued to R. W. Downing et al., on Mar. 19, 1971, and in the *The Bell System Technical Journal*, Vol. No. 43, No. 5, Parts 1 and 2, September, 1964. An updated central processor suitable for use in the switching system is described in this *The Bell System Technical Journal*, Vol. 56, No. 2, February, 1977. These references may be consulted for a more comprehensive understanding of the construction and operation of an electronic program-controlled local switching system office.

Each of toll switching system offices 104 and 105 is suitably an electronic program-controlled switching system such as the 4 ESS TM digital switch also available from AT&T. This digital switch is described in detail in the *The Bell System Technical Journal*, Vol. 56, No. 7, September 1977, and Vol. 60, No. 6, Part 2, July–August, 1981. These references may be consulted for a comprehensive understanding of the construction and operation of a toll switching system. Toll switching system offices 104 and 105 selectively interconnect individual trunks in response to routing information such as the directory number of a called customer line received from a local office.

A typical operator system such as the traffic service position system (TSPS) for use with local and toll offices is described in *The Bell System Technical Journal*, Vol. 49, No. 10, December, 1970 and Vol. 58, No. 6, Parts 1 and 2, July–August, 1977, and in U.S. Pat. No. 3,484,560 of R. J. Jaeger, Jr. issued Dec. 16, 1969. An operator system included as part of a switching system is the 5ESS TM digital switch operator service position system also commercially available from AT&T. Also included in the telecommunications network is a well-known revenue accounting office 109 which includes a billing system for generating billing statements. These billing statements list charges for calls under each subaccount billing number assigned by the customer during the billing period.

Figure 2:
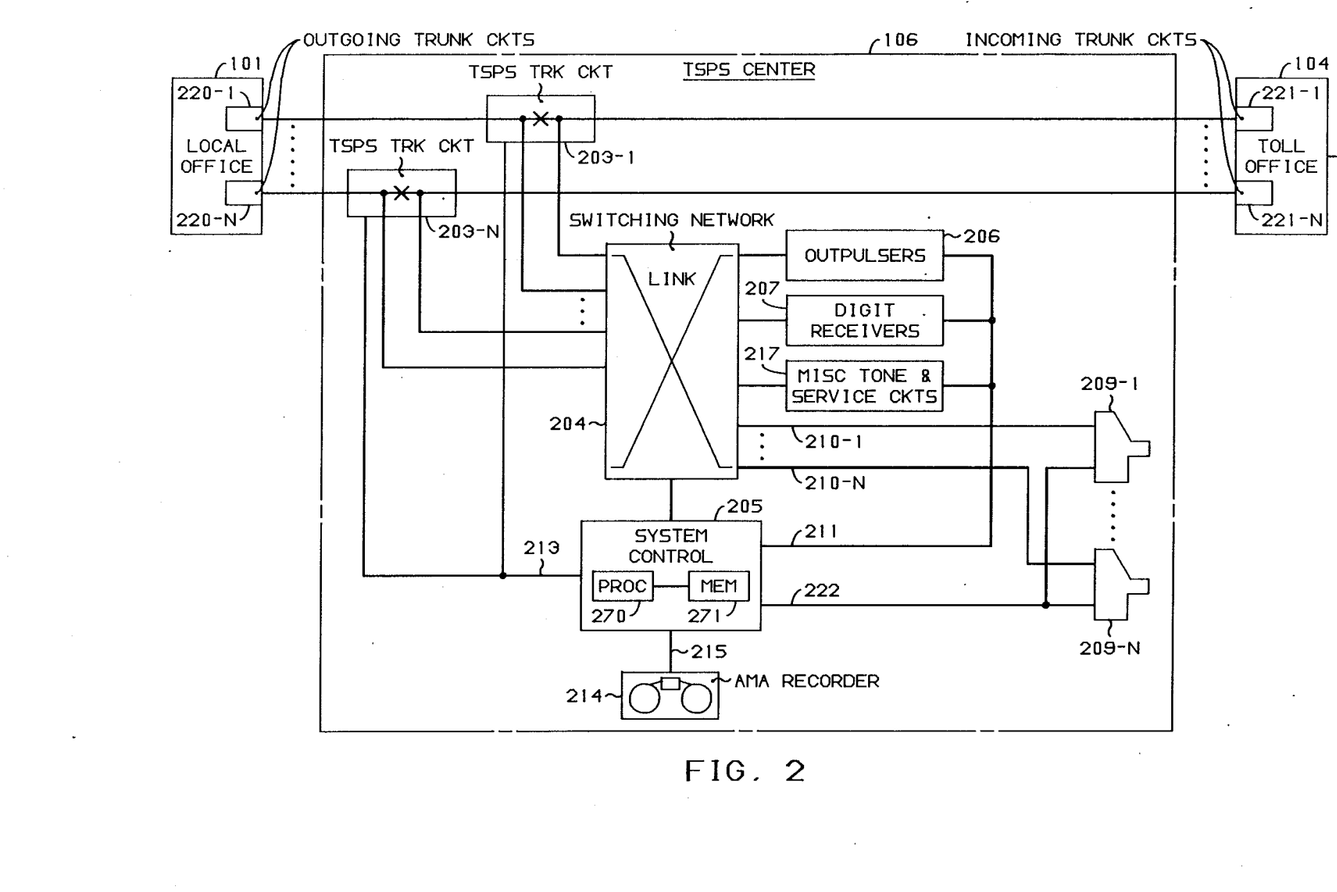
FIG. 2 discloses a more detailed block diagram of the illustrative operator system of FIG. 1.

FIG. 2 discloses a more detailed block diagram of illustrative TSPS center 106 interconnected between local office 101 and toll office 104. The TSPS center contains a plurality of trunk circuits 203-1 through 203-N, each of which is connected on its incoming side to a corresponding local office outgoing trunk circuit 220-1 through 220-N and on its outgoing side to a corresponding one of toll office 104 incoming trunk circuits 221-1 through 221-N. Each call from local office 101 is extended via a selected outgoing trunk circuit to its associated TSPS trunk circuit and, in turn, to its associated incoming toll office trunk.

The TSPS center further includes AMA recorder 214 and a plurality of operator positions 209-1 through 209-N, with each position having a individual appearance on right side of the switching network 204. The switching network, the AMA recorder and the operator positions, together with the other circuits shown, permit the TSPS center to provide a charge information recording operation which are extended from local office 101 via TSPS center to toll office 102. Switching network 204 is connected on its left side to trunk circuits 203-1 and 218-N and on its right side to a plurality of different circuits, including outpulsers 206, digit receivers 207, and miscellaneous tone and service circuits 217.

TSPS center 106 further includes system control 205. The system control is connected by cable 213 to trunk circuits 203-1 and 203-N by cable 216 to network 204, by cable 215 to well-known AMA recorder 214, by cable 211 to outpulsers 106, as well as by the same cable to digit receivers 207 and the miscellaneous tone and service circuits 217. System control 205 is further connected by cable 222 to operator positions 209-1 and 209-N. These connections permit the system control to regulate, control, and coordinate the operation of each circuit in order that the TSPS center may furnish the service required on each call it receives.

AMA recorder 214 records pertinent call charge information upon the termination of a call in response to the information received from system control 205.

Digit receivers 206 receive call information outpulsed from local office 101. Outpulsers 206 transmit to the toll office the information it needs on each call. Miscellaneous tone and service circuits provide various tones such as a "prompt" or a "bong" tone to the calling customer line via local office 101. A more detailed description of the TSPS center is described in the aforecited patent of R. J. Jaeger, Jr.

System control 205 also includes a well-known processor 270 which is controlled by program instructions stored in program and data memory 271.

Figure 3:
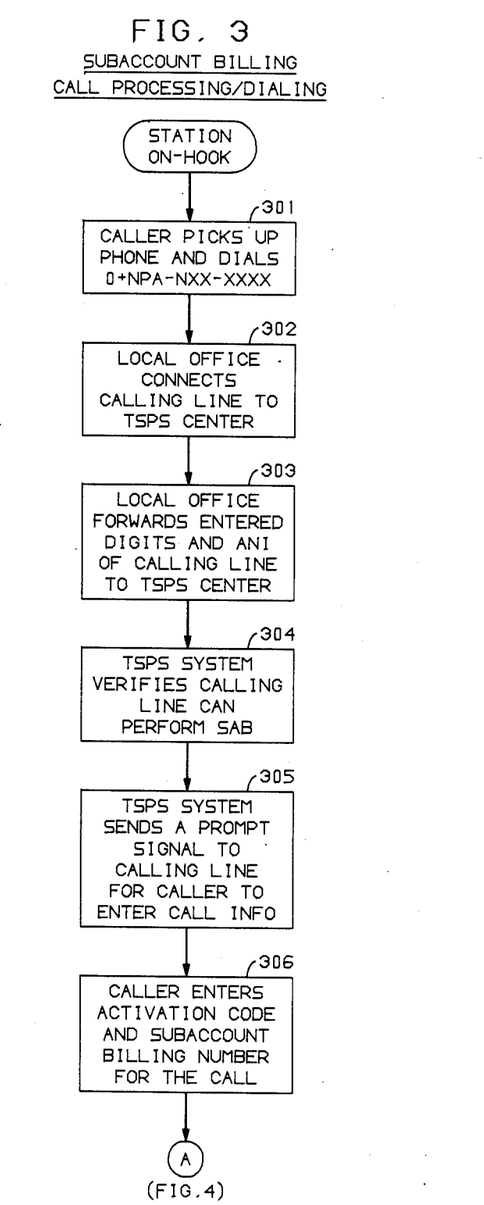
FIGS. 3 and 4 are a flow diagram illustrating the steps of the subaccount billing service.
Figure 4:
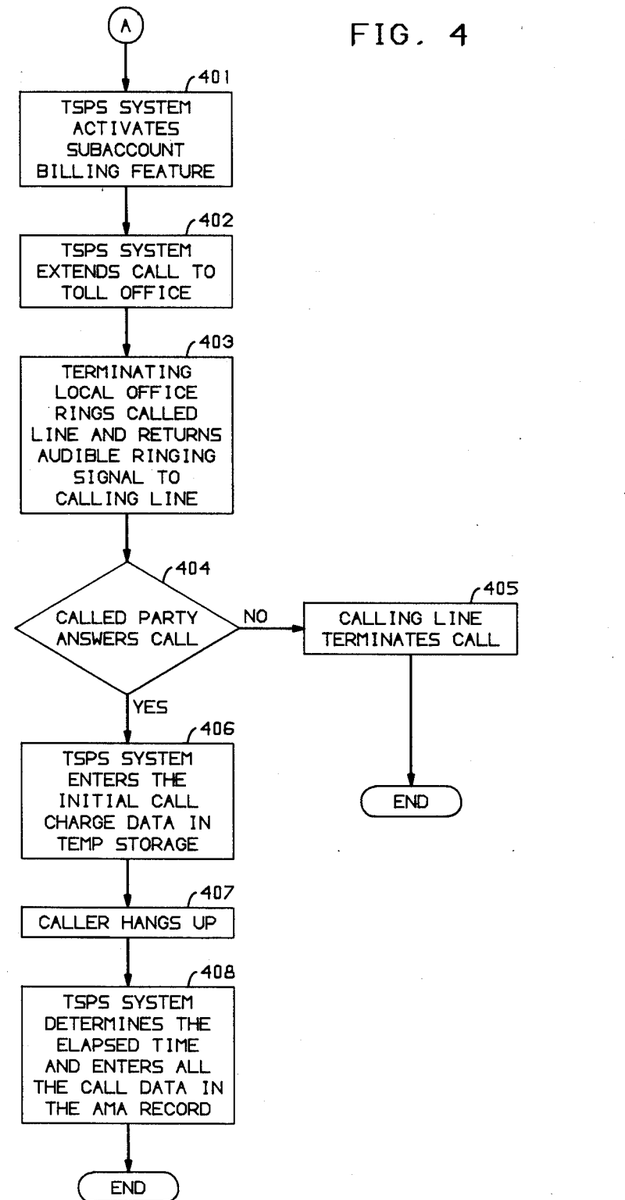

Depicted in FIGS. 3 and 4 is a flow diagram illustrating the steps utilized by a calling customer as well as that of the TSPS center and the local and toll telephone offices to provide the subaccount billing service.

Basically, the TSPS system permits customers to "tag" each outgoing call with any subaccount billing number assigned by the customer. To activate the subaccount billing service, the customer initially dials "0" plus the directory number of the called line to access the TSPS center and receive a prompt signal from the TSPS center. The customer then activates the service by entering a service activation code plus a subaccount billing number such as "15XX". The "15" activates the subaccount billing service within the TSPS center, and the "XX" numbers are the customer-assigned subaccount billing number that will be "tagged" to the call. The call is then extended from the TSPS center to the toll office and in turn through the network to the called line indicated by the entered called line directory number.

Upon completion of the call, the subaccount billing number is recorded on the automatic message accounting (AMA) billing information tape in the TSPS center for subsequent billing system processing. The customer is charged for the subaccount billing service on the basis either of the number of subaccount billing codes used each month or on the number of calls made each month. The call itself will be billed at regular tariff dial rates.

As depicted in FIG. 3, a customer at, for example calling line station 107 would pick up his phone and dial 0 plus NPA-NXX-XXXX, the directory number of the called line, the directory number of (block 301). In a well-known manner, local office 101 translates the entered digits and recognizes that the call must be forwarded to a operator system such as TSPS center 106

(block 302). The local office then forwards the entered called line directory number digits and the identification number (ANI) of the calling customer line to the TSPS center (block 303). The TSPS center verifies that the calling line can perform subaccount billing. This verification typically includes verifying that the calling customer line station equipment is a DTMF phone and that the phone is not a coin phone.

After verifying the calling customer station equipment, system control 205 causes a prompt signal to be sent from miscellaneous tone and service circuit 217 to the calling line for the caller to enter additional call information (block 305).

Figure 5:
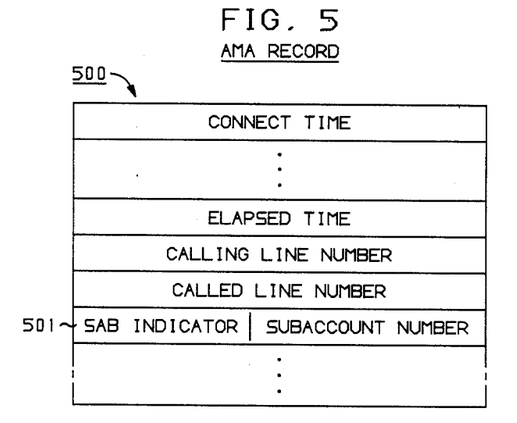
FIG. 5 depicts an illustrative AMA record for storing call charge information.

In response, the calling customer enters a service activation code such as "15" plus a 2-digit number indicative of the subaccount billing number assigned by the customer for the call (block 306). The TSPS system recognizes the subaccount billing activation code "15" and activates the subaccount biling service by setting the subaccount billing (SAB) indicator 501 as depicted in illustrative AMA record 500 of FIG. 5. (Block 401 of FIG. 4).

TSPS center 106 extends the call to toll office 104 which in turn connects the calling customer line to local office 102 in a well-known manner. Local office 102 rings the called line identified by the called directory number forwarded thereto and returns audible ring to the calling line (block 403).

When the called party does not answer the call (block 404), the calling line terminates the call in a well-known manner (block 405).

When the called party answers the call, the TSPS system enters initial call charge data in a temporary storage and at the termination of the call in in the well-known AMA record (block 406). This initial call charge data typically includes the connect time, the identification number of the calling customer line, the directory of the called line entered by the calling customer, and the subaccount billing number also entered by the calling customer as illustratively depicted in AMA FIG. 5.

At the termination of the call, the caller hangs up (block 407). The TSPS system determines the elapsed time of the call and enters all the call data in the AMA record (block 408).

In summary, a calling customer can activate the subaccount billing service on a "per call" basis and have that call tagged with a specific subaccount billing number. This subaccount billing number is recorded for each call is designated in an AMA record and stored on either a magnetic tape or disk as is convenient.

Figure 6:
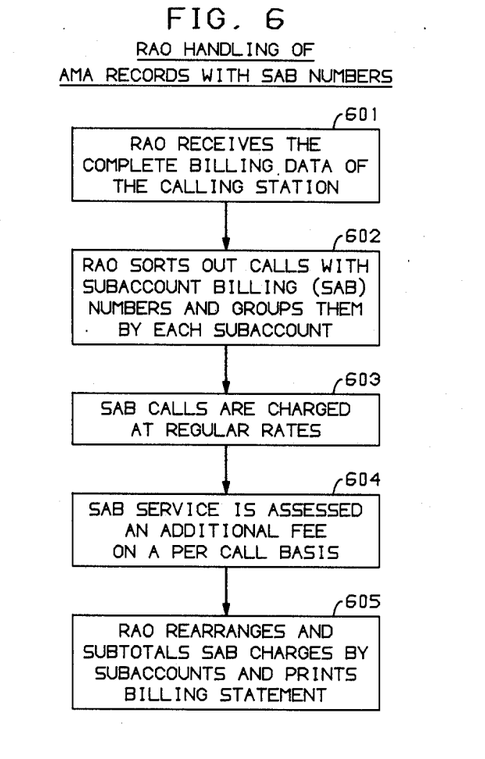
FIG. 6 depicts a flow diagram of the steps performed by a revenue accounting office for subaccount billing statements.

Periodically, the AMA data recorded on a tape or disk is physically removed and sent or teleprocessed to a revenue accounting office (RAO) 109 as shown in FIG. 1. As shown in FIG. 6, the revenue accounting office receives the complete billing data of the calling station (block 601). The revenue accounting office sorts out each call with a subaccount billing number and groups them by each subaccount (block 602). Subaccount billing calls are charged at regular tariff rates (block 603). Furthermore, subaccount billing service calls are accessed an additional fee on a per call basis (block 604).

Figure 7:
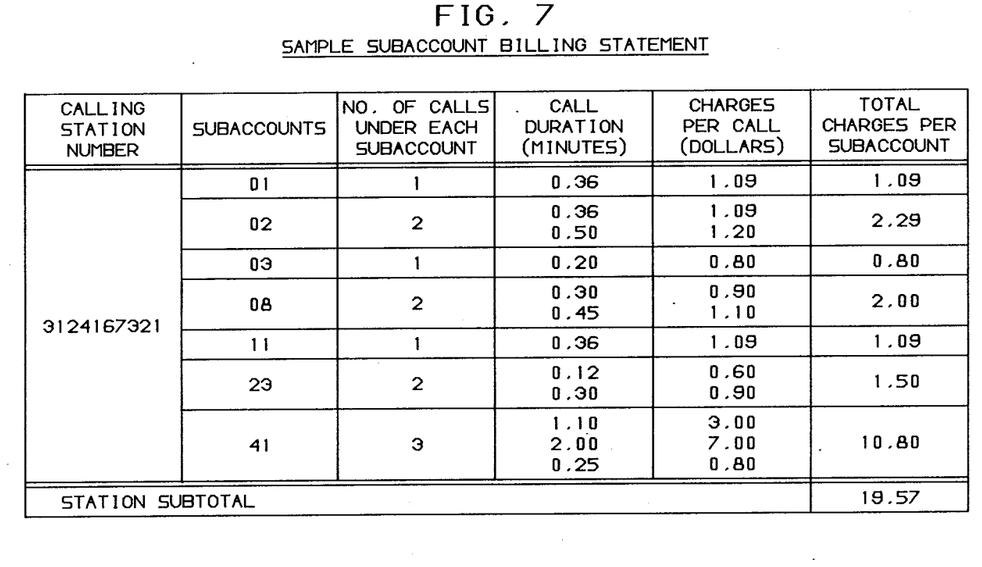
FIG. 7 depicts a sample subaccount billing statement.

The revenue accounting office rearranges and subtotals the subaccount billing charges by subaccounts and then prints a billing statement as shown illustratively in FIG. 7 (block 605).

Unlike other subaccount billing services the subaccount billing service of the present invention does not require a customer to presubscribe to the service; rather the customer activates the service on a "as needed" basis and is billed only for actual usage.

It is to be understood that the above-described method and apparatus for providing subaccount billing service is merely an illustrative embodiment of the principles of this invention and that numerous other methods and apparatus may be devised by those skilled in the art. In particular this subaccount billing service may be offered for calling card, collect, and third party billed calls. In the case of collect or third party billed calls, the called party would supply the subaccount billing number and an operator at the operator services system would enter the subaccount number. With third party number billed calls, the calling customer line would likewise enter the subaccount billing number. Furthermore, this service may be provided by ay local or toll office having a service activation or operator system feature with or without the use of a prompt signal being sent to the calling line.

What is claimed is:

1. Communication services apparatus comprising means responsive to an operator-designated call at an operator system for prompting a calling line for additional call information,
   characterized in that said apparatus further comprises:
   means responsive to a receipt of a service activation code and a customer-assigned subaccount billing number for extending said call through said operator system, and
   means for deriving charge information for said call including said subaccount billing number.

2. The apparatus of claim 1 wherein said means for deriving charge information for said call includes means for recording a connect time and an elapsed time for said call.

3. The apparatus of claim 1 further comprising means for transmitting said charge information including said subaccount billing number to a billing system.

4. The apparatus of claim 3 further comprising said billing system for generating a billing statement for said call, said billing statement including a charge for said call listed for said customer-assigned subaccount billing number.

5. The apparatus of claim 1 wherein said means for deriving charge information is also responsive to an identification number indicative of said calling line and a directory number of a called line for including said calling line identification number and said called line directory number in said charge information.

6. A communication service method comprising
   in response to an operator-designated call, prompting a calling line from an operator system to enter additional call information,
   characterized in that said method further comprises:
   extending said call through said operator system in response to a receipt of a service activation code and a customer subaccount billing number, and
   including said customer assigned subaccount billing number in charge information for said call.

7. The method of claim 6 further comprising
   receiving an identification number for said calling line and including said identification number in said charge information.

8. The method of claim 7 further comprising:
   requiring a call from a designated calling line to enter a customer subaccount billing number for said call.

9. The method of claim 7 further comprising charging said calling line a separate amount for each call in which a customer-assigned subaccount billing number is received.

10. The method of claim 7 further comprising sending said charge information to a billing system.

11. The method of claim 10 further comprising said billing system generating a billing statement for said call in response to a receipt of said charge information, said billing statement listing charges for said call listed for subaccount billing number.

12. The method of claim 11 further comprising said billing system generating a separate charge on said billing statement for said call having said charge information including said customer-assigned subaccount billing number.

13. A method of entering at a calling customer line a number indicator of an operator-designated call and a directory number of a called customer line;
  recognizing at a local exchange carrier office including a local telephone switching system serving said calling customer line said number indicative of said operator-designated call;
  forwarding said directory number of said called customer line and an identification number of said calling customer line from said local telephone switching system to an operator system;
  in response to a receipt of said directory number and said identification number, sending a prompt signal from said operator system to said calling customer line for entering additional call information;
  in response to said prompt signal, entering a service activation code and a customer-assigned subaccount billing number for said call at said calling customer line;
  in response to a receipt of said service activation code and said subaccount billing number for said call, setting a subaccount billing service indicative in an automatic message accounting record for said call at said operator system;
  in response to a receipt of said service activation code and said subaccount billing number for said call, extending said operator-designated call through said operator system to a common carrier interconnect network having a toll switching system for connecting said calling customer line to said called customer line;
  entering in said automatic message accounting record a connect time indicative of when said calling customer line is connected to said called customer line;
  entering in said automatic message accounting record said identification number, said directory number, said customer-assigned subaccount billing number, and an elapsed time indicative of when said calling customer line and said called customer line is disconnected after said lines are disconnected;
  sending said automatic message accounting record for said call to a revenue accounting office;
  generating at said revenue accounting office a billing statement for said calling customer line, said billing statement listing the long distance charges for said operator-designated call for said customer-assigned subaccount billing number; and
  billing a separate charge for said operator-designated call having said subaccount billing service indicator set.

14. Communication services apparatus comprising
  means responsive to a call for prompting a calling line for additional call information,
  characterized in that said apparatus further comprises:
  means responsive to a receipt of a service activation code and a customer-assigned subaccount billing number for extending a call through said apparatus, and
  means for deriving data for billing said call, said data including said subaccount billing number.

15. The apparatus of claim 14 wherein
  said means for deriving data for billing said call includes means for recording a connect time and an elapsed time for said call.

16. The apparatus of claim 14 further comprising means for transmitting said data including said subaccount billing number to a billing system.

17. The apparatus of claim 16 further comprising said billing system for generating a billing statement for said call, said billing statement including a charge for said call listed for said customer-assigned subaccount billing number.

18. The apparatus of claim 14 wherein said means for deriving data for billing said call is also responsive to an identification number indicative of said calling line and a directory number of a called line for including said calling line identification number and said called line directory number in said data.

19. A communication services method comprising
  in response to a call, prompting a calling line from a telecommunications switching system to enter additional call information,
  characterized in that said method further comprises;
  extending said call through said system in response to a receipt of a service activation code and a customer subaccount billing number; and
  including said customer-assigned subaccount billing number in charge information for said call.

20. The method of claim 19 further comprising
  receiving an identification number for said calling line and including said identification number in said charge information.

21. The method of claim 20 further comprising:
  requiring a call from a designated calling line to enter a customer subaccount billing number for said call.

22. The method of claim 20 charging said calling line a separate amount for each call in which a customer-assigned subaccount billing number is received.

23. The method of claim 20 further comprising sending said charge information to a billing system.

24. The method of claim 23 further comprising said billing system generating a billing statement for said call in response to a receipt of said charge information, said billing statement listing charges for said call listed for subaccount billing number.

25. The method of claim 24 further comprising said billing system generating a separate charge on said billing statement for said call having said charge information including said customer-assigned subaccount billing number.

26. Communication services apparatus comprising
  means responsive to a call for prompting a calling line for additional call information,
  characterized in that said apparatus further comprises
  means responsive to a receipt of a directory number or to a receipt of a directory number plus a service activation code and a customer-assigned subaccount billing number, for extending a call through said apparatus, and means responsive to a receipt of said code and said billing number for deriving data for billing said call, said data including said subaccount billing number.

27. A communication services method comprising in response to a call whose destination is identified by a received customer specified directory number, extending said call through a telecommunication switching system characterized in that said method further comprises:

receiving a service activation code and a customer subaccount billing number, and including said customer assigned subaccount billing number in charge information for said call.

28. Communication services apparatus comprising means responsive to a receipt of one of a directory number or a directory number plus a service activation code and a customer-assigned subaccount billing number for extending a call through said apparatus, and means responsive to a receipt of said code and said billing number for deriving data for billing said call, said data including said subaccount billing number.

29. A telecommunication switching system, comprising: means for generating toll billing data in response to a call on a toll network, said toll billing data comprising data for identifying a calling and a called number, and further responsive to an additional dialed code and a subaccount number received in said system for generating additional toll billing data comprising data representing said subaccount number.

* * * * *